United States Patent [19]

Meisner et al.

[11] Patent Number: 4,644,210
[45] Date of Patent: Feb. 17, 1987

[54] HIGH SPEED INDUCTION MOTOR WITH SQUIRREL CAGE ROTOR

[75] Inventors: John W. Meisner, Newbury Park; Lynn E. Donelan, Canoga Park, both of Calif.

[73] Assignee: Rockwell International Corporation, El Segundo, Calif.

[21] Appl. No.: 808,195

[22] Filed: Dec. 12, 1985

[51] Int. Cl.⁴ .............................................. H02K 17/16
[52] U.S. Cl. .................................... 310/211; 310/256; 310/54
[58] Field of Search ................. 310/54, 125, 166, 211, 310/212, 216, 218, 254, 261, 256

[56] References Cited

U.S. PATENT DOCUMENTS

| | | | |
|---|---|---|---|
| 2,286,008 | 6/1942 | Pfalzgraff | 310/211 |
| 2,372,590 | 3/1945 | Ljunggren et al. | 310/166 |
| 2,411,002 | 11/1946 | Rüdenberg | 310/212 |
| 2,781,465 | 2/1957 | Schuff | 310/211 |
| 2,844,745 | 7/1958 | Hamm | 310/57 |
| 3,060,335 | 10/1962 | Greenwald | 310/54 |
| 3,075,103 | 1/1963 | Ward, Jr. | 310/54 |
| 3,502,924 | 3/1970 | Staebler | 310/211 |
| 3,504,153 | 3/1970 | Beyersdorf | 310/211 |
| 3,662,200 | 5/1972 | Rank et al. | 310/211 |
| 4,454,438 | 6/1984 | Yamashita et al. | 310/156 |

FOREIGN PATENT DOCUMENTS

| | | | |
|---|---|---|---|
| 230983 | 10/1960 | Australia | 310/211 |
| 354838 | 7/1961 | Switzerland | 310/212 |

*Primary Examiner*—Patrick R. Salce
*Assistant Examiner*—D. L. Rebsch
*Attorney, Agent, or Firm*—H. Fredrick Hamann; Harry B. Field; Lawrence N. Ginsberg

[57] ABSTRACT

A high speed induction motor comprising a stator and a rotor coaxially positioned within the stator, and mounted in a suitable frame having a water cooled jacket. The stator includes a multiphase winding 16 on a laminated core 18, and having stainless steel end plates 24. Cooling coils 30 are around the end turn portions of the windings, and layers of insulation 28 are between the windings and the cooling coils. The rotor 12 has a core section 37 and an integral shaft 38. A plurality of elongated conductor bars 40 fit tightly into semiclosed elongated slots 42 in the rotor core 37, the slots and bars preferably having a wedge shaped cross section, and having a narrow neck portion adjacent the outer periphery of the rotor core, forming rotor teeth 54 between adjacent conductor bars. Copper end rings 68 are provided at opposite ends of the rotor core, with reduced opposite end portions 76 of the conductor bars received and brazed within spaced slots 70 around the periphery of the end rings. The copper end rings are spaced from the ends of the rotor core by non-magnetic spacers 78 and retained by titanium end caps.

24 Claims, 10 Drawing Figures

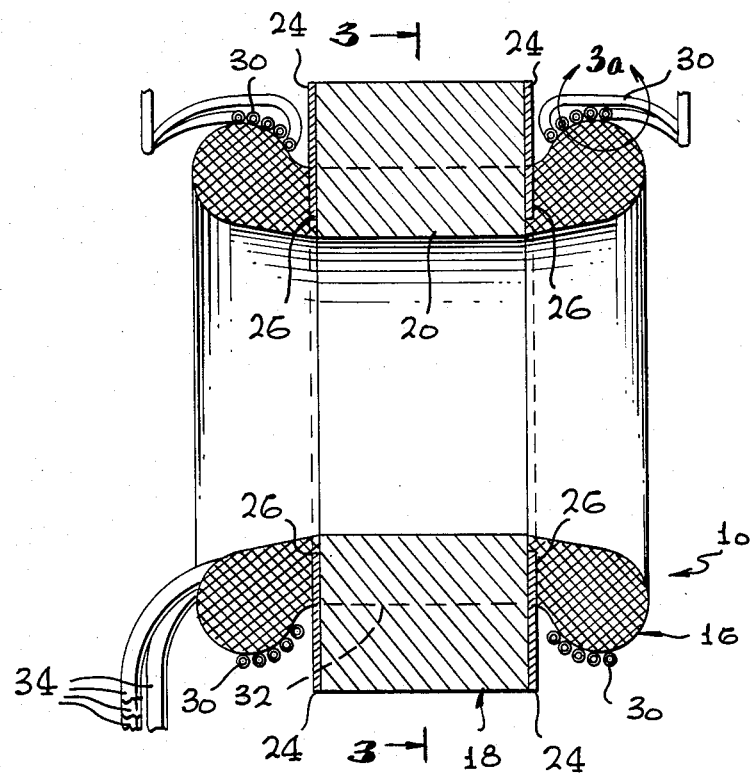
FIG. 2
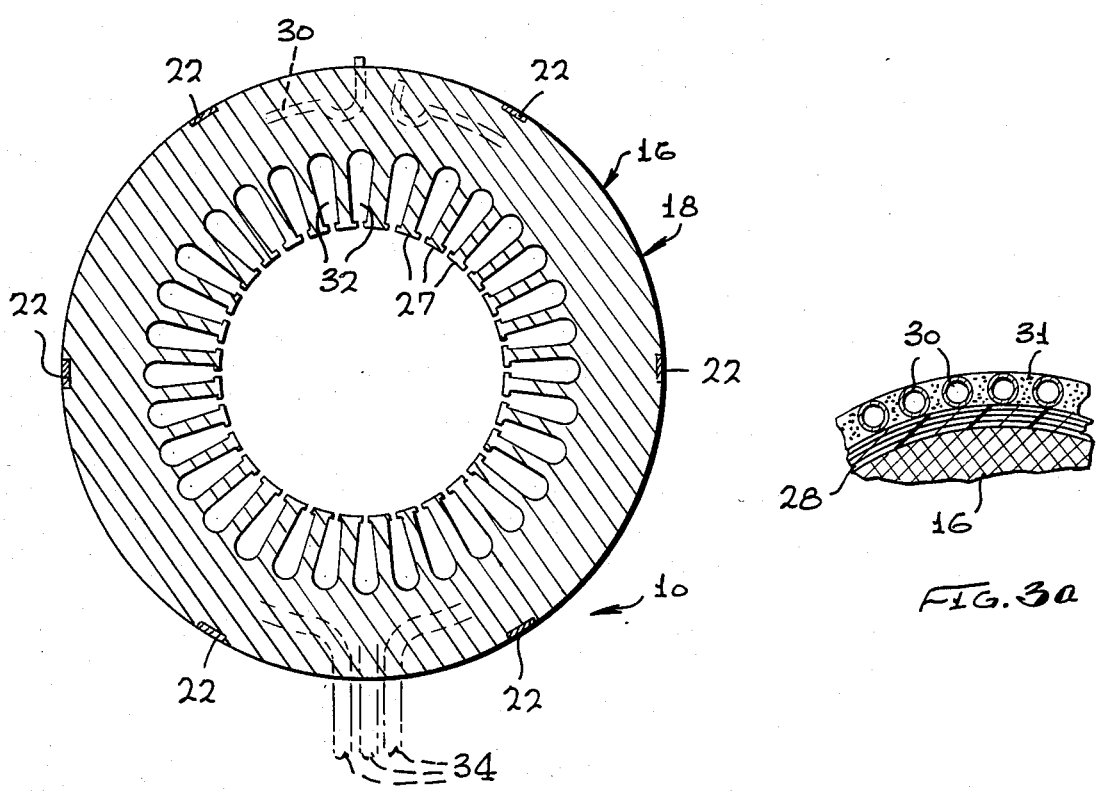
FIG. 3
FIG. 3a

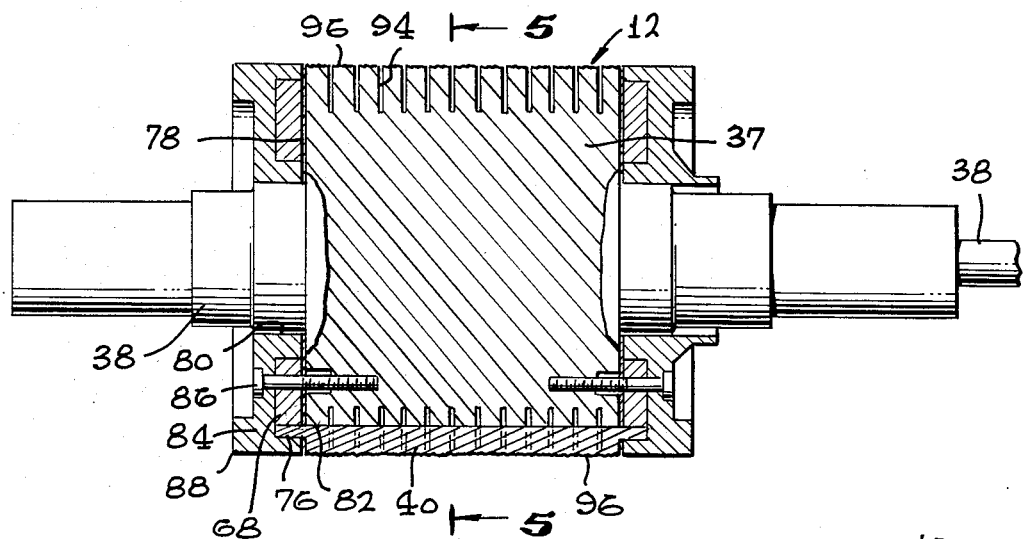
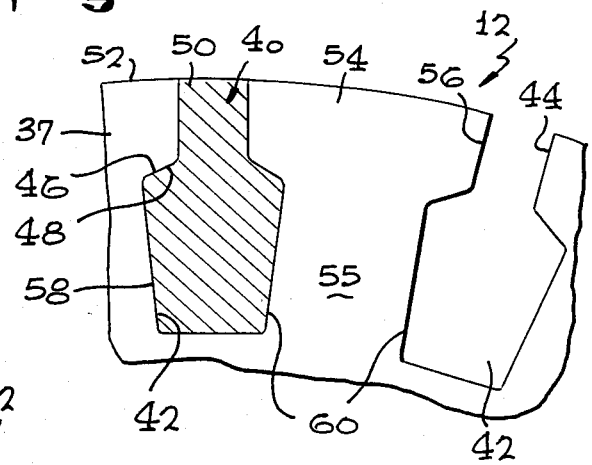
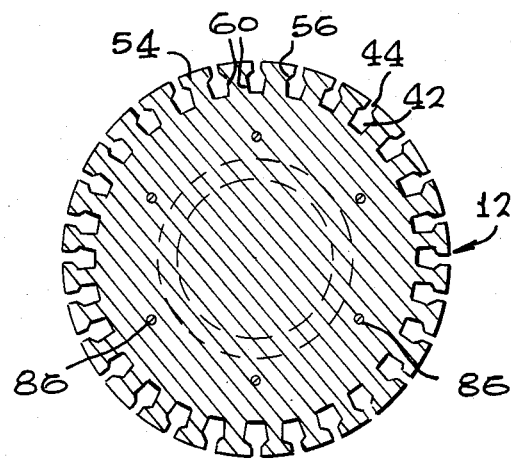
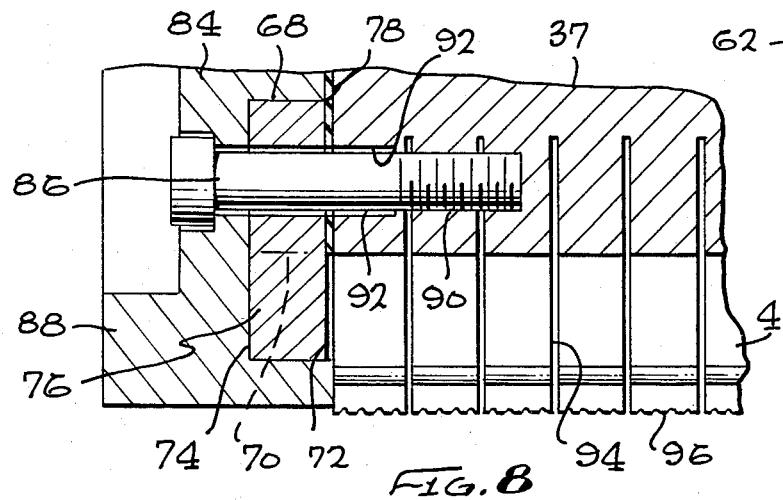

HIGH SPEED INDUCTION MOTOR WITH SQUIRREL CAGE ROTOR

BACKGROUND OF THE INVENTION

1. Field of the Invention

This invention relates to induction motors, and is particularly directed to an improved high speed induction motor.

2. Description of the Prior Art

Heretofore, operation of induction motors at high speeds, e.g. up to 18,000 rpm, and delivering, e.g. up to 300 horsepower, was not achievable chiefly because of rotor failure due to centrifugal forces, rotor instability due to dimensional changes, or operation in the range of shaft or bearing natural frequency, which resulted in high amplitude deflections and high forces.

SUMMARY OF THE INVENTION

There is accordingly provided by the present invention a high speed induction motor which overcomes the above deficiencies, resulting in efficient high speed operation. The basic components of the invention induction motor which cooperate to achieve the improved results comprise a random wound, water cooled, three phase stator assembly, a solid alloy steel rotor with copper conductors and titanium end caps, and an oil jet lubricated bearing system.

The stator is the random wound type and is insulated preferably with a so-called Class H insulation system. The windings provide the rotating field necessary for induction motor operation. The laminated core assembly is enclosed in a water jacket to dissipate the heat generated due to electrical losses. Further cooling of the stator windings can be provided by water cooling coils wound around and bonded, with a thermally conductive compound, to the winding end turns.

The rotor is the main feature of the present invention. The motor rotor and shaft is composed of a single piece of alloy steel. Copper conductors or bars fit into semiclosed slots which are machined into the rotor periphery. Radial restraint of the bars in the core section is provided by the projections of the rotor teeth at the semiclosed end of the slots. Copper end rings are brazed to the bars to complete the secondary electrical circuit.

The end rings are held a distance from the steel rotor core by means of non-magnetic metal spacers and are restrained by means of uniquely formed titanium end caps which fit tightly on the rotor shaft and are held in place with cap screws. Circumferential grooves are cut into the rotor to a depth preferably greater than the depth of the rotor conductors prior to the assembly of the rotor, and shallow grooves or threads are also cut into the surface of the rotor, for purposes hereinafter discussed.

The bearing system is composed of two precision angular contact ball bearings at each end of the rotor shaft. These bearings are separated by spacers and oil jet rings so that the preload provided by wave springs is maintained. Oil under pressure is forced through two jets to each of the bearings. Return oil is conducted through passages in the housing to an external sump where it is cooled and filtered.

OBJECTS OF THE INVENTION

It is accordingly one object of the present invention to provide an improved induction motor.

Another object of the present invention is the provision of a novel induction motor system which operates efficiently at high speed and delivers greater horsepower.

A particular object of the invention is to provide an improved high speed induction motor which operates at high speeds and horsepower, without the danger of rotor instability or rotor failure due to centrifugal forces, or due to high amplitude deflections and high forces.

These and other objects and features of the present invention will be apparent from the following detailed description, taken in conjunction with the accompanying drawings.

DESCRIPTION OF THE DRAWINGS

FIG. 2 is a longitudinal cross section of the stator of FIG. 1;

FIG. 3 is a transverse section of the stator of FIG. 2, taken on line 3—3 of FIG. 2;

FIG. 3a is a detail taken around line 3a of FIG. 2;

FIG. 4 is a longitudinal section of the rotor of FIG. 1;

FIG. 5 is a transverse section of the rotor of FIG. 4, taken on line 5—5 of FIG. 4;

FIG. 6 is a detail showing the wedge-shaped rotor slot cross-section of the rotor of FIG. 4, containing a wedge-shaped conductor bar;

FIG. 7 shows a modification of the rotor slot cross-section of the rotor of FIG. 4, containing a rotor conductor bar of rectangular cross section.

FIG. 8 is an enlarged view of a portion of FIG. 4, showing the end ring, end cap and cap screw arrangement; and FIG. 9 is a cross-sectional enlarged detail of the bearing system, taken around line 9—9 of FIG. 1.

DESCRIPTION OF THE PREFERRED EMBODIMENTS

Figure 1:
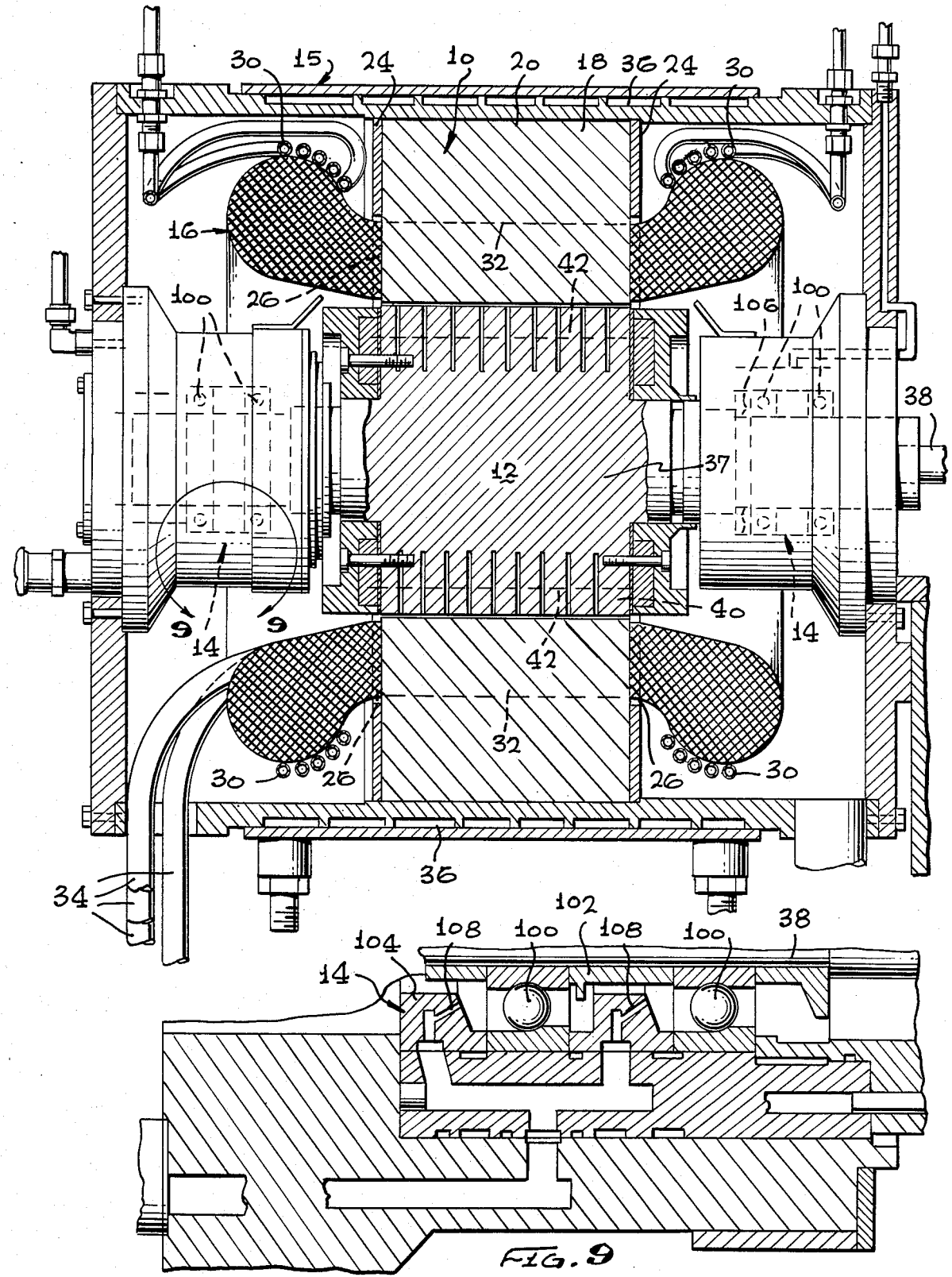
FIG. 1 is a longitudinal cross section of a high speed induction motor according to the invention, showing the assembled stator and rotor mechanisms.

Referring to FIG. 1 of the drawing, the squirrel cage high speed induction motor of the invention comprises a random wound, water cooled three phase stator assembly 10, a solid alloy steel rotor assembly 12 coaxially mounted within the stator, and an oil jet lubricated bearing system for the rotor, indicated at 14, as described in detail below. The stator 10 and rotor 12 are mounted and assembled in a suitable frame 15.

Referring also to FIGS. 2 and 3, the stator 10 comprises an insulated three phase winding 16 to generate the required rotating magnetic field, wound on a core 18 forming a stator stack. The stator stack is composed of silicon steel laminations 20 held together with six building bars 22 and stainless steel (non-magnetic) end plates 24. The stainless steel end plates 24 are provided with projections 26 which support the laminations at the ends of the stator teeth 27. The non-magnetic property of the bars 22 and end plates 24 serves to reduce the losses due to the rotating field which is in close proximity to the end plates.

Referring to FIG. 3a, layers of insulation 28 are provided around the windings 16, and the stator windings are cooled by means of water circulated through metallic tubing 30 which is wound circumferentially around the outer diameter of the end turn portions of the windings 16. The layers of insulation 28 between the windings 16 and the cooling coils 30 assure that the electrical integrity of the winding is preserved. The voids around the cooling coils 30 are encapsulated with a suitable compound 31, such as silicone rubber, to prevent movement of the coils and facilitate heat transfer from the windings to the cooling coils.

As seen in FIG. 3, slots 32 are provided for the windings, and electrical leads 34 are provided from the windings to provide the primary current for the stator. The stator can be powered by a variable frequency, variable voltage inverter (not shown).

As noted in FIG. 1, water cooling passages 36 are provided in the outer jacket of the frame 15. Water cooling of the motor frame and of the stator winding removes the heat generated by the electrical losses and maintains the insulation 28 and winding insulation at a temperature less than 180° C. e.g. for a so-called Class H insulation material.

Referring now to FIGS. 1, 4 and 5 of the drawings, the motor rotor 12 comprises a core section 37 and an integral output shaft 38, the rotor core and shaft being composed of a single piece of alloy steel. A plurality of elongated copper conductor bars 40 fit into semiclosed elongated slots 42 which are provided in the core 37, the slots being equally spaced radially around the rotor periphery. The copper conductors 40 are configured so that they provide a tight fit in the rotor slots and almost completely fill the slots.

As seen particularly in FIGS. 5 and 6, the slots 42 are wedge shaped, converging radially toward the axis of the rotor, and have an outer narrow neck portion 44 adjacent the outer periphery of the rotor core, and the conductor bars 40 which fit into the slots are similarly wedge shaped and have an upper shoulder portion 46 abutting an adjacent shoulder portion 48 of the slot 42, and a narrow neck portion 50 which is accommodated within the neck portion 44 of the slot 42. It is seen that the top of the neck portion 50 of the conductor bars 40 coincides with the outer periphery of the rotor, and thus the rotor peripheral surface is smooth and the windage loss due to rotor rotation is thereby reduced.

The radial portion of the rotor core between two adjacent conductor bars 40 forms a rotor tooth indicated at 54 having outer projections 56. Thus, outward radial restraint of the conductor bars 40 in the core section 37 of the rotor is provided by the projections 56 of the rotor teeth 54 at the semiclosed ends or neck portions 44 of the slots 42. The cross sectional configuration of the copper conductors 40, as wedges, and having radially downwardly convergent sides 58, allows the adjacent steel rotor teeth 54 to have parallel sides 60. This shape of the rotor teeth 54 provides more steel in the tooth portion of the rotor magnetic path, thereby reducing the magnetizing force required to maintain a given level of magnetic field. The wider tooth root also reduces the rotational stresses in the teeth.

Referring now to FIG. 7, conductor bars 62 of rectangular cross section can be employed instead of the wedge shaped conductor bars 40. In this modification, the radial slots 64 accommodating the conductor bars 62 also have parallel sides, and hence the resulting rotor teeth 66 between adjacent conductor bars 62 have radially convergent sides 67 and thus the resulting rotor teeth 66 have less steel in the tooth root portion 68 than in the root portion 55 of the rotor teeth 54. Thus, this embodiment is less preferred than the embodiment of FIG. 6, containing the wedge shaped conductor bars 40.

Referring to FIGS. 4 and 8, conducting, e.g. copper, end rings 68 are provided at opposite ends of the rotor core 37. The copper end rings are each provided with a plurality of spaced slots 70 around its outer periphery, which extend completely through the end ring from one side 72 to the opposite side 74 of such ring. The slots 70 receive outwardly extending reduced size end portions 76 of the conductor bars 40 in closely fitting relation, and are brazed in place in the copper end rings to assure a good electrical contact and relatively high mechanical strength. The end rings 68 are maintained a distance from the ends of core section 37 of the steel rotor 12 by means of a non-magnetic spacer 78, to reduce the electrical reactance of the end ring. The ring shaped spacers 78 extend radially from a shoulder 80 on the rotor shaft 38, outwardly to the base 82 of the elongated conductor bars 40.

Since copper is not sufficiently strong to withstand the rotational stresses generated at the 18,000 RPM speed at which the induction motor operates, the copper end ring 68 must be restrained. This is accomplished by providing around each of rings 68 an end cap 84, preferably composed of titanium, which fits tightly on the rotor shaft 38 and is held in place with a plurality of spaced cap screws 86. The end caps 84 are provided with an outboard peripheral rim portion 88. The end cap 84 serves a dual function in that it also provides a means of balancing the rotor 12. The cross-sectional shape of the end cap 84 is such that the outer rim 88 is balanced, i.e. the radial force due to the copper end ring is partially balanced by the radial force due to the balance ring or outboard portion of the rim 88. Also, the inner diameter of the end cap 84 is made slightly smaller than the corresponding portion of the rotor shaft 38. Thus, a shrink fit is obtained during the assembly of the end cap 84 on the rotor shaft 38, which reduces the tendency of the end cap to become loose on the shaft due to the rotational forces. This factor adds to the high speed stability of the rotor. It is seen that the end cap 84 completely encloses the copper end ring 68 except on the rotor core side.

The end caps 84 are securely retained on the rotor by means of the cap screws 86 which pass through the end cap, end ring 68 and spacer 78, and are threaded at 90 into the rotor body core 37. Clearance holes 92 are provided through the end cap 84, end ring 68 and spacer 78, and partially into the rotor body 37, to allow the cap screws to deform radially over a controlled length as the rotor operates at speed. Thus, the concentration of stresses at a single point in the cap screw 86 is avoided. The material of the end caps must be non-magnetic, such as titanium, to reduce the effect of flux fringing from the air gap and to reduce the reactance of the end rings 68.

Circumferential grooves 94 are cut into the rotor core 37, along substantially the entire length of the rotor core, such grooves being cut into the rotor to a depth preferably below, i.e. radially inward of, the rotor conductor bars 40, prior to the assembly of the rotor. Such circumferential grooves serve to break up the currents in the iron teeth 54 of the rotor core 37, thereby reducing the losses in the iron core. Fine or shallow circumferential grooves 96 are also cut into the surface of the rotor core 37 between the circumferential grooves 94, along the length of the rotor. Such fine grooves or threading have a function similar to that of the circumferential grooves 94, for the higher frequency currents which only penetrate the surface of the steel core 37 to a shallow depth.

Referring to FIGS. 1 and 9, the shaft 38 of the rotor is mounted for rotation on oppositely positioned bearing systems, indicated at 14. Each of such bearing systems is composed of two precision angular contact ball bearings 100. These bearings are separated by spacers 102 and oiling rings 104, so that the preload provided by wave springs 106 in the bearing assembly at the output shaft 38 is maintained. Oil under pressure is forced through two jets 108 to each of the inner race surfaces of the bearings. Return oil is conducted through passages (not shown) in the housing to an external sump (not shown) where it is cooled and filtered.

In operation, current passed through the three phase winding 16 of the stator 10 produces a rotating magnetic field, the magnetic lines of which will cut the copper conductor bars 40 of the coaxially mounted rotor 12, inducing large currents in the bars, and causing rotation of the rotor with the rotating magnetic field generated by the stator.

This induction motor allows operation at speeds up to 18,000 RPM and delivers up to 300 horsepower. The motor operates to provide such brake horsepower output at the 18,000 RPM speed without excessive energy losses or excessive vibration.

From the foregoing, it is seen that the invention provides a unique and improved squirrel cage type induction motor operating efficiently at high speed and horsepower not heretofore attainable. The design of the induction motor of the invention, particularly the rotor construction, provides high stability and resistance to failure due to centrifugal forces.

It is to be understood that what has been described is merely illustrative of the principles of the invention and that numerous arrangements in accordance with this invention may be devised by one skilled in the art without departing from the spirit and scope thereof.

What is claimed is:

1. In an induction motor comprising a stator including a laminated iron core, and a multiphase winding on said core; and a rotor including a one piece rotor core and shaft coaxially mounted within the stator; the improvement wherein said rotor comprises a plurality of elongated slots in the periphery of the rotor core, said slots having a reduced outer radial end portion adjacent to the core periphery and partially enclosing said slots,
   a plurality of elongated conductor bars received in said slots and having reduced outer radial end portions received in the reduced outer radial end portions of said slots, and providing outer radial restraint of said conductor bars in the rotor core, said conductor bars having end portions extending outwardly beyond the ends of said rotor core,
   conductor end rings at opposite axial ends of the rotor core, said end rings having a plurality of slots in the periphery thereof, said end portions of said conductor bars received in said last mentioned slots, and
   non-magnetic metal spacers mounted between the ends of the rotor core and the conductor end rings for reducing the self-induced magnetic field around the end rings thereby reducing the electrical reactance of the end rings.

2. The induction motor of claim 1, said elongated slots in said rotor core having a wedge shaped cross-section and converging radially toward the axis of said rotor, said conductor bars of said rotor core having a wedge shaped cross-section and fitting tightly in the rotor slots.

3. The induction motor of claim 2, the cross-section of said rotor core between adjacent wedge shaped conductor bars therein forming rotor teeth, said teeth having parallel sides and having projections formed adjacent to the reduced outer radial end portions of said slots, thereby providing said outer radial restraint of said conductor bars in said rotor core.

4. The induction motor of claim 1, said elongated slots in said rotor core having a rectangular cross-section and said conductor bars of said rotor core having a rectangular cross-section and fitting tightly in the rotor slots, the cross-section of said rotor core between adjacent rectangular shaped conductor bars therein forming rotor teeth, said teeth having projections formed adjacent to the reduced outer radial end portions of said slots, thereby providing said outer radial restraint of said conductor bars in said rotor core.

5. The induction motor of claim 1, said rotor including
   an end cap mounted on the rotor at opposite axial ends thereof, the end caps each substantially enclosing the adjacent conductor end ring,
   a rim extending outwardly around the periphery of said end cap, said end caps restraining the conductor end rings during rotation of said rotor and also functioning to balance said rotor, and
   fastener means connecting said end caps to the rotor core.

6. The induction motor of claim 5, the inner diameter of each end cap being slightly smaller than the diameter of the rotor shaft and forming a shrink fit of said end cap on said shaft, the end cap completely enclosing the conductor and rings except on the rotor core side.

7. The induction motor of claim 5, said fastener means for said end cap comprising cap screws passing through said end cap and said end ring, and threadably connected to the rotor core.

8. The induction motor of claim 7, including clearance holes for said cap screws provided in said end cap and end ring and partially in said rotor core, to permit the cap screws to deform radially as the rotor operates at speed.

9. The induction motor of claim 1, including circumferential grooves provided in the rotor core, to break up the currents penetrating the outer periphery of the rotor core and reduce losses in the rotor core.

10. The induction motor of claim 9, said grooves extending radially to a depth below the rotor conductor bars.

11. The induction motor of claim 9, including fine grooves provided in the periphery of the rotor core to break up high frequency currents penetrating the outer periphery of the rotor core only to a shallow depth.

12. The induction motor of claim 3, said rotor including
   a titanium end cap mounted on the rotor at opposite axial ends thereof, the end caps each substantially enclosing the adjacent conductor end ring,
   a rim extending outwardly around the periphery of said end cap, said end caps restraining the conductor end rings during rotation of said rotor and also functioning to balance said rotor, and
   fastener means connecting said end caps to the rotor core.

13. The induction motor of claim 12, said fastener means for said end cap comprising cap screws passing through said end cap and said end ring and threadably connected to the rotor core, and including clearance holes for said cap screws provided in said end cap and end ring and partially in said rotor core, to permit the cap screws to deform radially as the rotor operates at speed.

14. The induction motor of claim 13, including circumferential grooves provided in the rotor core, said grooves extending radially to a depth below the rotor conductor bars, to break up the currents penetrating the outer periphery of the rotor core and reduce losses in the rotor core, and including fine grooves provided in the periphery of the rotor core to break up high frequency currents penetrating the outer periphery of the rotor core only to a shallow depth.

15. An induction motor comprising a frame, a stator mounted in said frame and a rotor mounted coaxially within said stator, for rotation in response to a rotating magnetic field provided by said stator, said stator comprising
  a laminated stator core,
  a plurality of longitudinally extending bars holding said laminated stator core together,
  a multiphase electrical winding on said core to generate the required magnetic field, and
  stainless steel end plates connected to opposite ends of said core and supporting said laminated core; said rotor comprising
  a rotor core,
  a shaft integrally formed on said rotor core,
  a plurality of elongated slots in the periphery of the rotor core, said slots having a reduced outer radial end portion adjacent to the core periphery and partially enclosing said slots,
  a plurality of elongated copper conductor bars received in said slots and having reduced outer radial end portions received in the reduced outer radial end portions of said slots, and providing outer radial restraint of said conductor bars in the rotor core, said conductor bars having end portions extending outwardly beyond the ends of said rotor core,
  copper end rings at opposite axial ends of the rotor core, said end rings having a plurality of slots in the periphery thereof, said end portions of said conductor bars received in said last mentioned slots, and
  non-magnetic metal spacers mounted between the ends of the rotor core and the conductor end rings for reducing the self-induced magnetic field around the end rings thereby reducing the electrical reactance of the end rings.

16. The induction motor of claim 15, including
  cooling coils wound around said electrical winding to remove heat generated by electrical losses,
  insulation between said winding and said cooling coils, and
  a cooling water jacket in said frame.

17. The induction motor of claim 16, including a thermally conductive compound in the voids between said cooling coils to prevent movement thereof and facilitate heat transfer from the windings to the cooling coils.

18. The induction motor of claim 15, including a bearing system for said rotor, said bearing system comprising,
  a pair of angular contact ball bearings at each end of the rotor shaft,
  spacers and oil jet rings separating the two bearings of each of said pair of bearings,
  a pair of jets communicating with the two bearings of each said pair of bearings, for passage of oil under pressure to each of said bearings and
  spring means in contact with the bearings at the output end of said shaft to maintain a predetermined load on said bearings.

19. The induction motor of claim 16, said elongated slots in said rotor core having a wedge shaped cross-section and converging radially toward the axis of said rotor, said conductor bars of said rotor core having a wedge shaped cross-section and fitting tightly in the rotor slots, the cross-section of said rotor core between adjacent wedge shaped conductor bars therein forming rotor teeth, said teeth having parallel sides and having projections formed adjacent to the reduced outer radial end portions of said slots, thereby providing said outer radial restraint of said conductor bars in said rotor core.

20. The induction motor of claim 19, said rotor including
  a titanium end cap mounted on the rotor at opposite axial ends thereof, the end caps each substantially enclosing the adjacent conductor end ring,
  a rim extending outwardly around the periphery of said end cap, said end caps restraining the conductor end rings during rotation of said rotor and also functioning to balance said rotor,
  fastener means connecting said end caps to the rotor core, said fastener means for said end cap comprising cap screws passing through said end cap and said end ring, and threadably connected to the rotor core,
  clearance holes for said cap screws provided in said end cap and end ring and partially in said rotor core, to permit the cap screws to deform radially as the rotor operates at speed, and
  circumferential grooves provided in the rotor core, to break up the currents penetrating the outer periphery of the rotor core and reduce losses in the rotor core.

21. In an induction motor comprising a stator including a laminated iron core, and a multiphase winding on said core, and a rotor including a one piece rotor core and shaft coaxially mounted within the stator, the improvement wherein said rotor comprises:
  a plurality of elongated slots in the periphery of the rotor core, each of said slots having a reduced outer radial end portion adjacent to the core periphery and partially enclosing said slots;
  a plurality of elongated conductor bars received in said slots and having reduced outer radial end portions received in the reduced outer radial end portions of said slots, and providing outer radial restraint of said conductor bars in the rotor core, said conductor bars having end portions extending outwardly beyond the ends of said rotor core;
  conductor end rings at opposite axial ends of the rotor core, said end rings having a plurality of slots in the periphery thereof, said end portions of said conductor bars received in said last mentioned slots;
  non-magnetic metal spacers mounted between the ends of the rotor core and the conductor end rings;

an end cap mounted on the rotor at opposite axial ends thereof; the end caps each substantially enclosing the adjacent conductor end ring;

a rim extending outwardly around the periphery of said end cap, said end caps restraining the conductor end rings during rotation of said rotor and also functioning to balance said rotor; and fastener means connecting said end caps to the rotor core, said fastener means for said end cap comprising cap screws passing through said end cap and said end rings, and threadably connected to the rotor core, clearance holes being providing for said cap screws in said end cap and end ring and partially in said rotor core, to permit the cap screws to deform radially as the rotor operates at speed.

22. In an induction motor comprising a stator including a laminated iron core, and a multiphase winding on said core, and a rotor including a one-piece rotor core and shaft coaxially mounted within the stator, the improvement wherein said rotor comprises:

a plurality of elongated slots in the periphery of the rotor core, each of said slots having a reduced outer radial end portion adjacent to the core periphery and partially enclosing said slots and an inner radial portion having a wedge-shaped cross section and converging radially toward the axis of each rotor;

a plurality of elongated conductor bars each having an inner radial portion with a wedge-shaped cross section and fitting tightly in the rotor slots and having a reduced outer radial end portion recieved in the reduced outer radial end portion of a slot, said conductor bars having end portions extending outwardly beyond the ends of said rotor core, the cross section of said rotor core between adjacent wedge-shaped conductor bars therein forming rotor teeth, said teeth having parallel sides and having projections formed adjacent to the reduced outer radial end portions of said slots, thereby providing outer radial restraint of said conductor bars in said rotor core;

conductor end rings at opposite axial ends of the rotor core, said end rings having a plurality of slots in the periphery thereof, said end portions of said conductor bars received in said slots;

non-magnetic metal spacers mounted between the ends of the rotor core and the conductor end rings;

a titanium end cap mounted on the rotor at opposite axial ends thereof, the end caps each substantially enclosing the adjacent conductor end ring;

a rim extending outwardly around the periphery of said end cap, said end caps restraining the conductor end rings during rotation of said rotor and also functioning to balance said rotor; and fastener means connecting said end caps to the rotor core, said fastener means for said end cap comprising cap screws passing through said end cap and said end ring and threadably connected to the rotor core, and including clearance holes for said cap screws provided in said end cap and end ring and partially in said rotor core, to permit the cap screws to deform radially as the rotor operates at speed.

23. In an induction motor of the type including a frame, a stator mounted in said frame, a rotor mounted coaxially within said stator for rotation in response to a rotating magnetic field provided by said stator, and a bearing system for said rotor, the improvement comprising:

said stator having
a laminated stator core,
a plurality of longitudinally extending bars holding said laminated stator core together,
a multiphase electrical winding on said core to generate the required magnetic field, and
stainless steel and plates connected to opposite ends of said core and supporting said laminated core;

said rotor having
a rotor core,
a shaft integrally formed on said rotor core,
a plurality of elongated slots in the periphery of the rotor core, said slots having a reduced outer radial end portion adjacent to the core periphery and partially enclosing said slots,
a plurality of elongated copper conductor bars received in said slots and having reduced outer radial end portions received in the reduced outer radial end portions of said slots, and providing outer radial restraint of said conductor bars in the rotor core, said conductor bars having end portions extending outwardly beyond the ends of said rotor core,
copper end rings at opposite axial ends of the rotor core, said end rings having a plurality of slots in the periphery thereof, said end portions of said conductor bars received in said last mentioned slots, and
non-magnetic metal spacers mounted between the ends of the rotor core and the conductor end rings; and said bearing system for said rotor having
a pair of angular contact ball bearings at each end of the rotor shaft,
spacers and oil jet rings separating the two bearings of each of said pair of bearings,
a pair of jets communicating with the two bearings of each said pair of bearings for passage of oil under pressure to each of said bearings, and
spring means in contact with the bearings at the output end of said shaft to maintain a predetermined load on said bearings.

24. An induction motor comprising:
a frame, a stator mounted in said frame and a rotor mounted coaxially within said stator, for rotation in response to a rotating magnetic field provided by said stator;
said stator having:
a laminated stator core,
a plurality of longitudinally extending bars holding said laminated stator core together,
a multiphase electrical winding on said core to generate the required magnetic field with cooling coils wound around said electrical winding to remove heat generated by electrical losses, insulation between said winding and said cooling coils, and a cooling water jacket in said frame, and
stainless steel end plates connected to opposite ends of said core and supporting said laminated core;
said rotor having:
a rotor core;
a shaft integrally formed on said rotor core,
a plurality of elongated slots in the periphery of the rotor core, each of said slots having a reduced outer radial end portion adjacent to the core periphery and partially enclosing said slots, and an inner radial portion having a wedge-shaped cross section and converging radially toward the axis of said rotor, a plurality of elongated copper conductor bars having inner radial portions with a wedge-shaped cross section and fitting tightly in the rotor slots, and having reduced outer radial end portions received in the reduced outer radial end portions of said slots, the cross section of said rotor core between adjacent wedge-shaped conductor bars therein forming rotor teeth, said teeth having parallel sides and having projections formed adjacent to the reduced outer radial end portions of said slots, thereby providing said outer radial restraint of said conductor bars in said rotor core;

a titanium end cap mounted on the rotor at opposite axial ends thereof, the end caps each substantially enclosing the adjacent conductor end ring, a rim extending outwardly around the periphery of said end cap, said end caps restraining the conductor end rings during rotation of said rotor and also functioning to balance said rotor, fastener means connecting said end caps to the rotor core, said fastener means for said end cap comprising cap screws passing through said end cap and said end ring, and threadably connected to the rotor core, clearance holes for said cap screws provided in said end cap and end ring and partially in said rotor core, to permit the cap screws to deform radially as the rotor operates at speed, and circumferential grooves provided in the rotor core, to break up the currents penetrating the outer periphery of the rotor core and reduce losses in the rotor core.

* * * * *